United States Patent
Doyle et al.

(10) Patent No.: US 6,561,022 B1
(45) Date of Patent: May 13, 2003

(54) POSITION ENCODER

(75) Inventors: Richard Alan Doyle, Cambridgeshire (GB); Euan Morrison, Cambridgeshire (GB); Andrew James White, Cambridgeshire (GB); Victoria Ann Clark, Cambridgeshire (GB)

(73) Assignee: Scientific Generics Limited, Cambridgeshire (GB)

( * ) Notice: Subject to any disclaimer, the term of this patent is extended or adjusted under 35 U.S.C. 154(b) by 0 days.

(21) Appl. No.: 09/786,416

(22) PCT Filed: Jun. 15, 2000

(86) PCT No.: PCT/GB00/02329
§ 371 (c)(1),
(2), (4) Date: Oct. 11, 2001

(87) PCT Pub. No.: WO00/77480
PCT Pub. Date: Dec. 21, 2000

(30) Foreign Application Priority Data

Jun. 15, 1999 (GB) .............................. 9913935

(51) Int. Cl.[7] .................. G01F 23/60; G01F 23/30; H01F 5/00; H01F 21/06; G01B 7/14
(52) U.S. Cl. ............ 73/313; 73/314; 324/207.15; 324/207.24; 336/136; 340/623
(58) Field of Search .............. 73/313, 314; 324/207.15, 324/207.24; 336/136; 340/623

(56) References Cited

U.S. PATENT DOCUMENTS 2,569,106 A * 9/1951 James et al. .................. 73/314
4,079,627 A * 3/1978 Gundlach .................... 73/313
4,723,446 A    2/1988 Saito et al. .................. 73/313
4,737,698 A    4/1988 McMullin et al. .......... 318/653
5,421,193 A    6/1995 Carlin et al. ................ 73/49.2
5,483,831 A * 1/1996 Steiner ........................ 73/313
5,585,786 A * 12/1996 Clark et al. ................ 340/623
5,950,487 A * 9/1999 Maresca, Jr. et al. ........ 73/293

FOREIGN PATENT DOCUMENTS

| EP | 0 295 609 | 12/1988 |
| EP | 0 378 402 | 7/1990 |
| WO | WO95/31696 | 11/1995 |

* cited by examiner

Primary Examiner—Daniel S. Larkin
Assistant Examiner—K. Wilson
(74) Attorney, Agent, or Firm—Finnegan, Henderson, Farabow, Garrett & Dunner, L.L.P.

(57) ABSTRACT

A linear position sensor is provided which employs phase quadrature sensor windings, an excitation winding and a resonator. When an excitation current is applied to the excitation winding, it causes the resonator to resonate which in turn induces signals in the sensor windings. The sensor windings are spatially arranged so that the electromagnetic coupling between them and the resonator varies with the position of the resonator. The excitation windings, phase quadrature windings and resonant circuit are arranged so that the magnetic fields involved in the operation of the position sensor are substantially parallel to each other and the direction of movement of the resonator. Consequently, the effect of rotation of the resonator or lateral movement of it relative to the excitation and phase quadrature windings is alleviated.

50 Claims, 4 Drawing Sheets

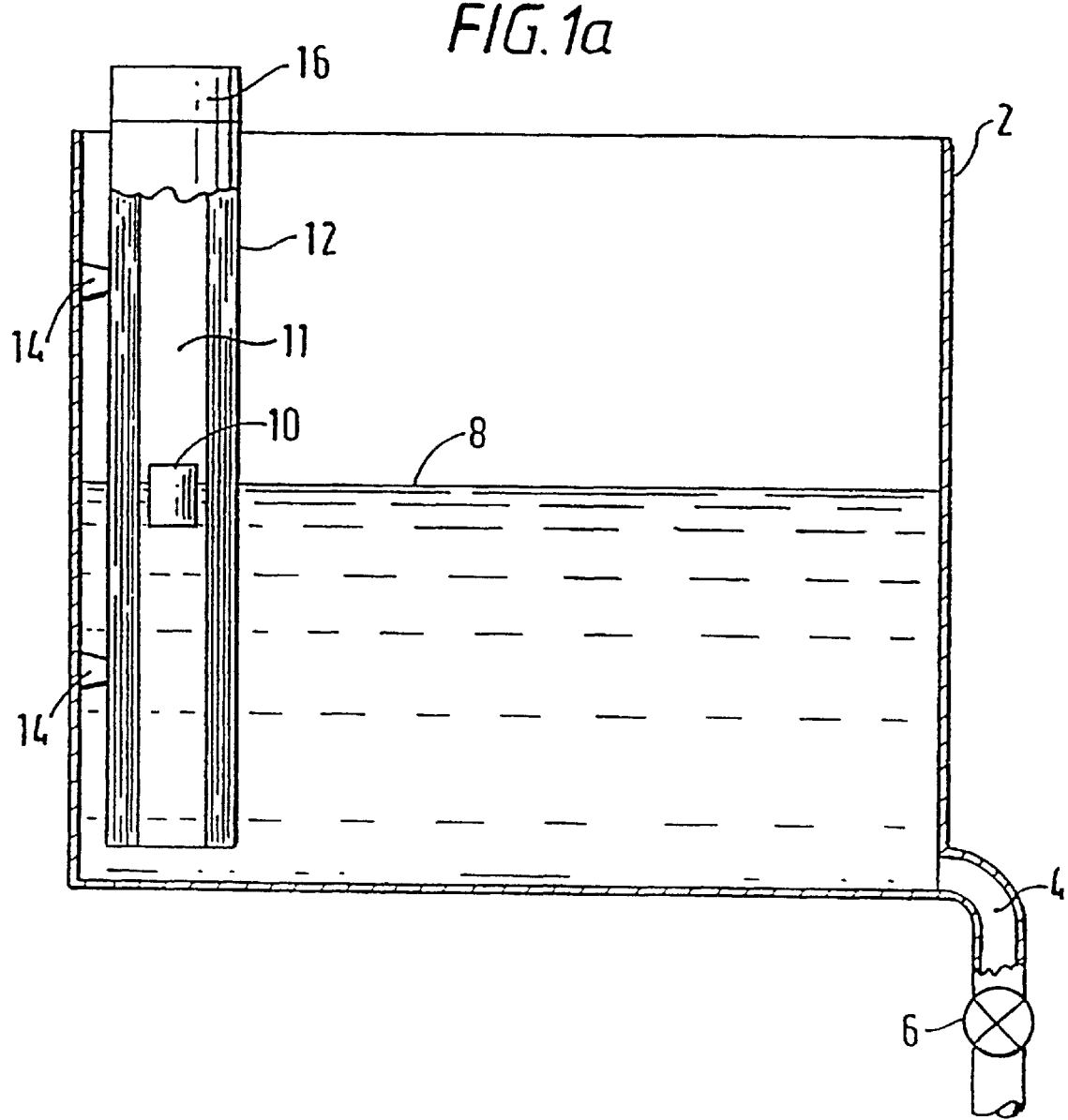

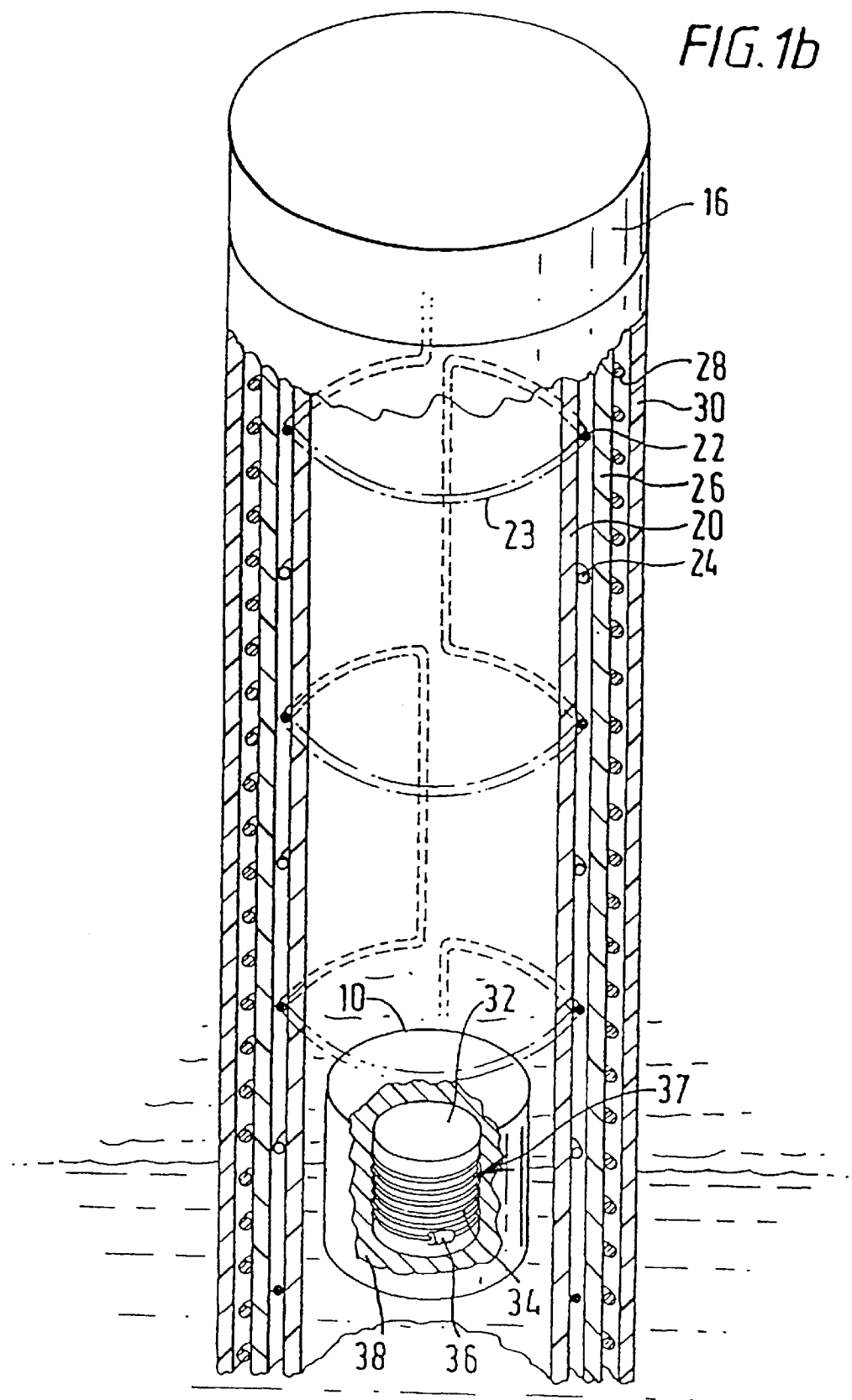

Figure 3:
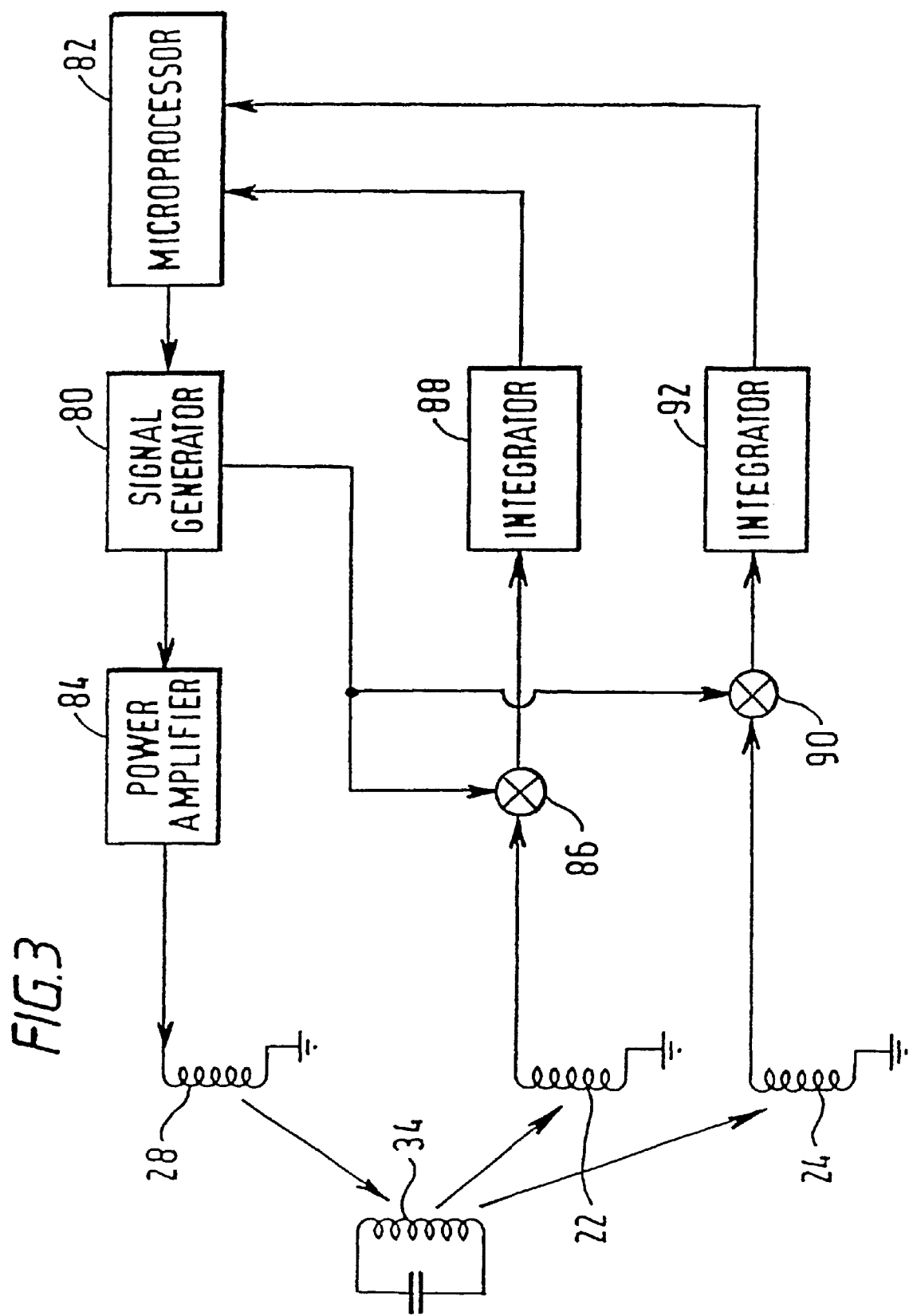

FIG.2a
FIG.2b
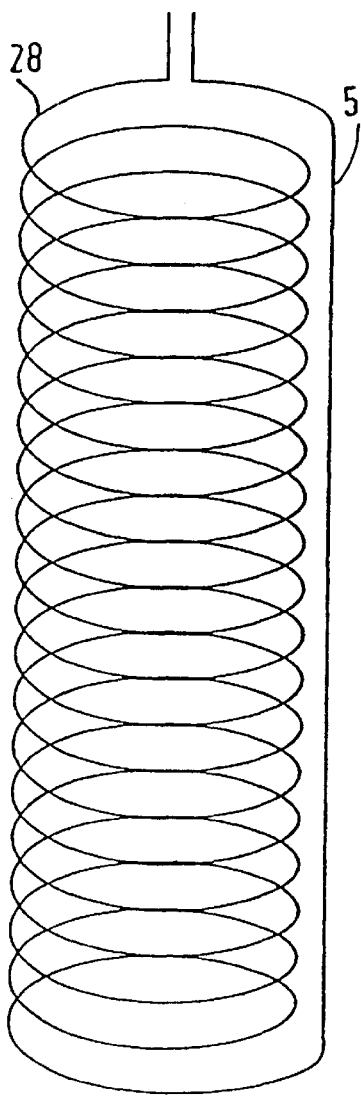
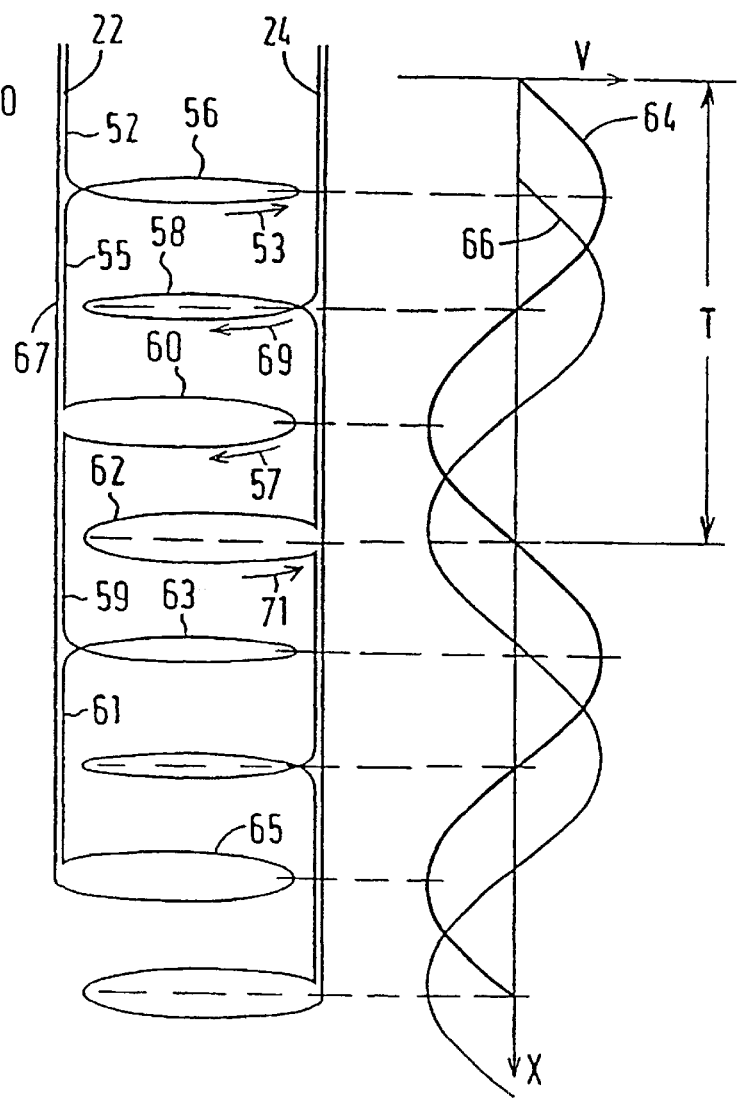

POSITION ENCODER

POSITION ENCODER

The present invention relates to position encoders, particularly linear position encoders with a cylindrical or conical geometry. The present invention is applicable to, but not limited to, fluid level sensors, particularly for use in fluid dispensing systems. The present invention is particularly useful in environments subject to electromagnetic interference.

Generally, many types of non-contact linear position encoders are known. These include arrangements in which magnetically sensitive windings are mounted on a stationary element which is positioned relative to a moving element arranged to produce electromagnetic fields that couple with the stationary element. The degree of coupling is dependent upon the relative position of the movable element to the stationary element, thus the position of the movable element can be determined from the signals coupled into the windings of the stationary element.

A different type of magnetic coupling arrangement is disclosed in WO95/31696. This discloses a linear position encoder having a support upon which a pair of quadrature windings and an excitation loop are mounted. The windings are arranged to have a sinusoidal magnetic sensitivity characteristic along the length of the support. Mounted on a movable element there is a resonant circuit comprising a coil and capacitor that can magnetically couple with the windings. The excitation loop is used to produce a substantially uniform electromagnetic field that excites the resonant circuit. The resonant circuit itself then produces electromagnetic fields that induce voltages in the windings. The voltages induced are dependent upon the position of the resonant circuit within a spatial period of the windings. This disclosed position encoder has an advantage that no connections need to be made to the moving element, namely the resonant circuit, and also has an advantage that the windings are balanced with respect to far-fields, hence reducing its susceptibility to electromagnetic interference.

WO95/31696 further discloses the use of the linear position encoder in fluid flow metering applications. This is achieved by mounting the resonant circuit on a movable element which is in the form of a float. However, limitations are imposed on the suitability of the disclosed encoder to such use due to the basic geometry and operation of the disclosed device. For example, the float containing the resonant circuit must be prevented from rotating, or any rotation must be monitored and compensated, involving further resonant circuits arranged with their axes orthogonal to the original resonant circuit.

The present invention employs the separate resonant circuit approach of WO95/31696, but provides a different geometry of excitation and phase quadrature windings which alleviates the above described disadvantages. The excitation windings, phase quadrature windings and winding in the resonant circuit are arranged so that the magnetic fields involved in the operation of the encoder are substantially parallel to each other and the direction of movement of the movable element. Consequently, the effect of rotation of the movable element or lateral movement of it relative to the excitation and phase quadrature windings is removed or at any least reduced.

In one aspect the present invention provides a position encoder comprising first and second members arranged to move relative to each other in a measurement direction; the first member comprising a winding arrangement having a plurality of substantially closed planar loops whose plane is substantially orthogonal to the measurement direction, and arranged so that EMFs induced in different loops by interference are at least to an extent opposed to each other; wherein the second member comprises an electromagnetic field generator or sensor which is electromagnetically coupled to said winding so that upon generation of a magnetic field by said generator or upon application of an excitation signal to said winding, there is induced in said winding or in said sensor respectively, an output signal dependent upon the relative position of said first and second members in the measurement direction.

In a further aspect the present invention provides a position detector in which a magnetic field generator and a sensor winding are arranged so that they can move relative to each other along a path, and wherein the magnetic field generated by the magnetic field generator is substantially parallel to the path, the sensor winding having induction loops arranged substantially orthogonal to the field generated by the magnetic field generator, and arranged in a spaced apart form so that movement by the magnetic field generator along the path provides a varying level of induction in the loops that varies according to the position of the field generator within the spacing between consecutive loops.

In a further aspect the present invention provides a position encoder comprising a winding arranged to generate electromagnetic fields in a direction substantially parallel to the direction along which the position is to be measured, the winding comprising loops of opposing sense spaced apart so that the field varies between loops along the movement direction, and a movable member comprising means for generating an electromagnetic field in response to an electromagnetic field received from the winding, the size of the electromagnetic field generated being dependent upon the relative position of the member and the spacing distance between the loops, and a further winding for receiving the varying electromagnetic field from the movable element arranged to provide an output signal dependent upon the level of the electromagnetic field received from the movable member.

Embodiments of the present invention will now be described by way of example only, with reference to the accompanying drawings, in which:

FIG. 1a schematically illustrates a fluid dispensing arrangement which employs a linear position encoder of cylindrical geometry to sense the level of the liquid being dispensed from a reservoir.

FIG. 1b is a part perspective part cross-section view of the linear position encoder shown in FIG. 1a, which illustrates the physical structure of an excitation winding, two sensor windings and a resonant circuit forming part thereof;

FIG. 2a schematically illustrates the form of the excitation winding shown in FIG. 1b;

FIG. 2b schematically illustrates the two sensor windings shown in FIG. 1b, and also the way in which the signal induced in each of the sensor windings by the resonant circuit varies as a function of its position along the axis of the windings; and FIG. 3 is a block diagram schematically illustrating the excitation and processing circuitry which forms part of the linear position encoder shown in FIGS. 1 and 2.

FIG. 1a schematically illustrates a liquid dispensing system of an automatic drinks machine. The system has a reservoir 2 for storing the liquid to be dispensed which has an outlet 4 through which the liquid is dispensed from the reservoir 2 according to operation of a valve 6. The valve 6 is controlled by signals from a control unit (not shown) of the automatic drinks dispensing machine.

The arrangement further includes a linear position encoder which is fixed in the reservoir 2 by fixing brackets 14 and which senses the surface level 8 of the liquid in the reservoir 2. The linear position encoder has a float 10 arranged to float on the surface 8 within the bore 11 of a cylinder 12 which forms part of the linear position encoder. The float 10 contains a resonant circuit. The cylinder 12 contains within its walls an excitation winding arranged to generate an excitation magnetic field and a pair of sensor windings arranged in phase quadrature. The excitation winding and the phase quadrature sensor windings are arranged so that when an excitation current is passed through the excitation winding, a resulting signal is output from each of the sensor windings which are dependent on the vertical position of the float 10 relative to the cylinder 12. A processing unit 16 is provided at the top of cylinder 12, for providing the excitation current to the excitation winding and for processing the signals from the sensor windings to determine the vertical position of the float 10. The processing unit 16 is coupled to the control unit (not shown) of the automatic drinks dispensing machine. The control unit is thus able to control the operation of the valve 6 in response to an indication of the level of the surface of the liquid as indicated by the signal from the processing unit 16.

Further details of the cylinder 12 and the float 10 will now be described with reference to FIG. 1b, which schematically illustrates these items in the form of a partial cut away representation. The wall of the cylinder 12 is built-up from concentric layers. In the present embodiment the structural strength of the cylinder is provided by the innermost layer 20 which is made of polycarbonate. The phase quadrature windings 22 and 24 are formed around the polycarbonate layer 20. The form of sensor winding 22 is shown in phantom by the dashed line 23. The other sensor winding 24 has a similar form but for the sake of clarity is only shown in cross section at the side of the polycarbonate wall 20. In the present embodiment the sensor windings 22 and 24 are formed by electrically conducting wire wound tight in the form illustrated against the outer surface of the polycarbonate layer 20. An insulation layer 26 is provided over the windings 22 and 24 as shown, which comprises an adhesive insulating tape.

The excitation winding 28 is formed from a continuous length of copper wire which is wound around the insulating layer 26 at a regular pitch. A final insulation layer 30 is positioned around the excitation winding 28. In the present embodiment, the insulating layer 30 is a further adhesive tape which both insulates the winding 28 and also seals the previously described layers against fluid ingress. The processing unit 16 is positioned at the top of the cylinder 12 as shown, and is of a watertight structure. The windings 22, 24 and 28 enter the processing unit 16 via watertight junctions (not shown).

FIG. 1b also shows the float 10, which comprises an air-core bobbin 32 around which is wound a coil 34 of electrically conducting wire. The coil thus forms an inductive solenoid. The ends of the coil are connected together through a capacitor 36 to form a resonant circuit 37. The air-core bobbin 32, coil 34 and capacitor 36 are encapsulated in a plastic material 38 providing an overall density of the float 10 appropriate for it to float at the surface of the liquid. In operation, as the level of the liquid changes, the float 10 therefore moves up and down the bore 11 of the hollow cylinder 12 with the level of the liquid.

FIG. 2a schematically illustrates the overall form of the excitation winding 28. As shown the winding is formed as a continually wound evenly spaced coil around a cylinder of constant circumference. After completion of the final loop, the wire returns via a straight return section 50 which is parallel to the axis of the cylinder. The excitation winding 28 thus forms a uniform solenoid, so that when an alternating current is passed through it, it produces a magnetic field in the direction of the axis of the cylinder.

FIG. 2b schematically illustrates the overall form of the phase quadrature sensor windings 22 and 24. As shown, the sensor winding 22 comprises an initial part 52 which is aligned parallel with the axis of the cylinder. The winding is then wound around the circumference of the cylinder 12 to form a loop 56 which is substantially orthogonal to the axis of the cylinder 12. This loop 56 is wound in the anticlockwise direction as indicated by the arrow 53. The winding is then directed further down the cylinder 12 in the direction parallel to the axis of the cylinder 12 over a length equal to the diameter of the loop 56, so forming a loop connecting portion 55. The winding is then again wound around the circumference of the cylinder 12 to form loop 60, although this time the loop is wound in the clockwise direction as indicated by the arrow 57. The loop 60 is also substantially orthogonal to the axis of the cylinder 12. The winding then again extends a length equal to the diameter of loops 60 and 56 along the edge of the cylinder 12 in the direction parallel to the axis of the cylinder 12 so forming another loop connecting portion 59, at which point it is then wound around the circumference of the cylinder in anticlockwise fashion to form a loop 63 of the same sense as the earlier described loop 56. The winding is then extended a further length 61 equal to the diameter of the cylinder 12 in the direction parallel to the axis of the cylinder 12 before being wound around the circumference of the cylinder in the clockwise direction to form a loop 65, thus producing overall an alternating arrangement of anticlockwise and then clockwise loops. The total number of loops depends on the length of the cylinder 12, since in the present embodiment the spacing between each anticlockwise loop and the next clockwise loop (and vice-versa) is equal to the diameter of the loops. For clarity, in FIG. 2b only a total of four loops per sensor winding are shown. After the final loop is completed, the wire is returned in length 67 back along the cylinder 12 in the direction parallel to the axis of the cylinder 12.

The other sensor winding 24 is laid out in a corresponding way, as follows. In the present embodiment, the loop connecting portions of the sensor winding 24 and the return length are positioned on the opposite extreme of the circumference of the cylinder 12 to those of the sensor winding 22. The first loop 58 of the sensor winding 24 is positioned half way between the first loop 56 and the second loop 60 of the sensor winding 22. Consequently, the second loop 62 of the second winding is positioned midway between the second and third loops of the sensor winding 22, and so on. This is to provide the required quadrature arrangement, which will be explained in more detail shortly below. In this embodiment the first loop 58 of the sensor winding 24 is wound in the clockwise direction as indicated by the arrow 69, the second loop 62 is wound in the anticlockwise direction as indicated by the arrow 71, and so on.

In the present embodiment the return length 67 of the first sensor winding 22 and the return length of the second sensor winding 24 are both directed along the cylinder in the direction parallel to the axis of the cylinder. This minimises the coupling of any radial component of the electromagnetic field emitted from the resonant circuit. Further, the total length in the direction of the axis of the cylinder 12 of the sensor windings 22 and 24 is made to be such that the excitation winding 28 extends further than the sensor windings 22 and 24 at each end of the cylinder 12 by at least the radius of the excitation winding 28.

The basic way in which movement of the float 10 along the axis of the above described windings is sensed will now be explained. When an excitation current is passed through the excitation winding 28, it generates a substantially uniform "excitation" magnetic field parallel to the axis of the cylinder 12. The excitation magnetic field induces an electromotive force (EMF) in the resonant circuit 37 contained in the float 10 which causes a current to flow in it. This current flowing in the resonant circuit generates a "resonator" magnetic field in the direction of the axis of the resonator coil 34 which is parallel to the axis of the cylinder 12. This resonator magnetic field induces an EMF in each of the sensor windings 22 and 24 which varies as a function of the relative position of the resonant circuit 37 and the sensor windings 22 and 24.

The right hand side of FIG. 2b illustrates the way in which the peak amplitudes 64 and 66 of the EMFs induced in the sensor windings 22 and 24 is assumed to vary as a function of the distance x along the axis of the cylinder 12. As shown, the variation is assumed to be sinusoidal, with the peaks of the sinusoidal variations being at the positions corresponding to the loops of the windings. Therefore, the period (or pitch) T of the sinusoidal variation is equal to the distance between loops that are wound in the same sense. Although a variation in the position of the resonant circuit could be deduced from the signal induced in just one of the sensor windings, in order to determine the position unambiguously within one period (T), the second sensor winding 24 is used to produce a signal which varies in phase quadrature to that of the first sensor winding 22. However, since there is more than one period (T) over the measurement range, it is necessary to provide a further means for determining absolute position. In this embodiment, this is performed by the processing unit 16 which counts the number of periods that have been passed through, relative to an absolute position which is defined by a separate conductor loop (not shown) wound around the circumference of the cylinder 12 at a position near the top of the cylinder 12 corresponding to the maximum fill level for the reservoir 2.

As a result of the alternating sense loops of the sensor windings 22 and 24, the sensor windings 22 and 24 are relatively immune to background electromagnetic interference. This design of sensor winding also reduces the direct coupling between the excitation winding 28 and the sensor windings 22 and 24. However, in order to reduce errors in the position measurement caused by direct breakthrough between the excitation winding 28 and the sensor windings 22 and 24, bursts of excitation signal are applied to the excitation winding 28 and the signals induced in the sensor windings 22 and 24 by the resonator 37 are only processed between these bursts. This is possible because the resonator 37 continues to resonate for a period of time after the excitation magnetic field has been removed.

The generation of the excitation current applied to the excitation winding 28, and the processing of the signals induced in the two sensor windings 22 and 24, will now be described with reference to FIG. 3 which is a block diagram showing the circuitry included in the processing unit 16. As shown, the processing unit 16 includes a signal generator 80 which is controlled by a microprocessor 82. The signal generator 80 generates an alternating excitation voltage having a fundamental frequency $f_o$, which is matched to the resonant frequency of the resonant circuit 37 of the float 10. The excitation voltage is applied to the excitation winding 28 via a power amplifier 84. As a result, an excitation current flows in the excitation winding 28 which generates the abovementioned "excitation" magnetic field which causes the resonator 37 to resonate.

As shown in FIG. 3, the signals induced in the sensor windings 22 and 24 are input to a respective mixer 86 and 90 which demodulates the induced signals by multiplying them with a 90° phase-shifted version of the excitation voltage which is applied to the excitation winding 28. The 90° phase shift is required due to the operation of the resonator 50 when it resonates. The output from the mixers 86 and 90 will comprises a DC component corresponding to the respective peak amplitudes 64 and 66 of the EMFs induced in the corresponding sensor windings 22 and 24, together with high frequency time varying components. The outputs from the mixers 86 and 90 are then integrated by a respective integrator 88 and 92 which removes these high frequency time varying components. The outputs from the integrators 88 and 92 are then passed to the microprocessor 82 which converts them into digital signals and then processes them using an arc-tangent function (atan 2) to determine the position of the resonator 37 relative to the sensor windings 22 and 24.

A brief overview has been given of the excitation and processing circuitry used in this embodiment. A more detailed description can be found in WO95/31696 discussed above.

As the skilled person will appreciate, a linear position encoder has been described for use in sensing the liquid level in a dispensing reservoir of an automatic drinks machine. The described linear position encoder has a number of advantageous features including the following. As described above, the loops within each of the sensor windings 22 and 24 are alternately wound clockwise then anticlockwise. This balanced form is relatively immune to background electromagnetic interference caused by far field or other external perturbations, such as metallic bodies located close to the sensor windings, because any EMFs induced by background fields are opposed in alternate loops. The generated electromagnetic fields and the direction of movement are all aligned substantially parallel to the axis of the cylinder. Therefore, in contrast to prior art arrangements, determined values of the moveable elements position are relatively insensitive to both variations in the radial position of the moveable element and rotation of the moveable element within the cylinder. Both of these characteristics are particularly advantageous in fluid level sensing applications. Moreover, the generally compact and uniform physical structure of the present embodiment is advantageously suited to many fluid level or other linear position sensing applications. Furthermore, the moveable element is not subjected to any substantial force that varies with respect to its position. This is again particularly advantageous for fluid level sensing applications, since such forces could otherwise alter the float's buoyancy. The use of a resonant circuit in the moveable element provides increased signal levels, and also allows the pulse echo process described above to be employed.

Modifications and Alternative Embodiments

In the above embodiment the excitation winding is wound around a true cylinder shape, i.e. it is of uniform circular circumference. In other embodiments, other configurations can be employed, provided a uniform or substantially uniform magnetic field is produced in the direction of the axis corresponding to the axis of the cylinder described above. Generally, any enclosed solenoid shape can be employed, provided it is adapted to provide the required level of uniform field. For example, cross sections other than circular can be employed, or a tapered cylinder, i.e. one whose diameter varies along the length of the cylinder, can be employed, depending upon the physical situation to be monitored. In each case, suitable fine tuning of the pitch and spacing of the loops of the excitation winding can be performed to provide the required level of uniformity of magnetic field.

Similarly, in the embodiment described above, the loops of the sensor windings were of circular cross-section and each of the same diameter. In other embodiments, cross sections other than truly circular can be employed (such as for example triangular) provided the loops are effectively closed in a plane. Also, for circular or other cross sectional loops, the diameter of the loops can vary over the length of the cylinder, i.e. the cylinder (or equivalent) can be tapered or otherwise varying. In this case, the individual loops can be variably spaced from each other in order to maintain the sinusoidal variation in coupling between the resonator and the sensor windings.

In the above embodiment the spacing between the alternate loops of a sensor winding is equal to the diameter of the loops. This spacing has been found to provide a good approximation to the desired sinusoidal response characteristics for a broad range of cylinder sizes and material choices. Nevertheless, in other embodiments other spacings can be employed. Also, for any given dimensions and material choices, variations from the desired strict sinusoidal response characteristic can be removed or reduced by forming each loop at a direction slightly away from truly orthogonal to the axis of the cylinder, i.e. a relatively small degree of pitch can effectively be introduced into the otherwise orthogonal loops of the phase quadrature windings. This small degree of pitch can be either down the cylinder, or up the cylinder. Another way in which the sinusoidal response characteristic can be fine tuned is to include a plurality of loops instead of a single loop at each loop position in the sensor winding. In this case, the number of loops at any point can be varied in order to alter the sinusoidal response characteristic, in the event that manufacturing tolerances or other design constraints have led to a non-true sinusoidal characteristic. Yet another factor which can influence the sinusoidal response characteristic is the spatial extent in the measurement direction of the resonator coil of the resonant circuit. Thus the sinusoidal response characteristic can further or alternatively be fine tuned by variation of the design of the resonator coil. In yet further embodiments, response characteristics other than truly sinusoidal ones can be accommodated by employing suitable processing algorithms when processing the received signals from the sensor windings. Of course, in other embodiments, any combination of the above possibilities can be employed. Also, multiple loops at each loop position in the sensor windings can be employed for reasons other than smoothing the sinusoidal response characteristics. For example, such multiple loops can be employed to provide increased absolute signal levels, or for averaging manufacturing tolerances. In many such cases, the number of loops at each loop position will therefore be equal.

The processing circuitry described with reference to FIG. 3 for the above embodiment can be varied in other embodiments as follows. In the above embodiment, the signals induced in the sensor windings were demodulated by being mixed with a 90° phase-shifted version of the excitation voltage which has been applied to the excitation winding. Alternatively, any other appropriate amplitude demodulation technique can be used to demodulate the induced signals, for example the signals can be rectified then filtered. Further, in the above embodiment, the processing circuitry included integrators for integrating the signals output from the mixer in order to remove the time-varying parts of the mixed signals because these average out over the period of integration. In other embodiments, low pass filters can be used instead of the integrators, to filter out these time-varying components.

In the above embodiment the ratio of the two demodulated signals output from the integrator was processed using an arctangent function to determine the current position (x) of the resonator. As those skilled in the art will appreciate, other techniques may be used, such as those described in WO98/00921.

In the above embodiment, there were two sensor windings, which were spaced apart along the measurement direction to provide a phase difference of 90° in the sinusoidal response characteristic of each of the sensor windings. In other embodiments, other numbers of phase quadrature windings can be employed. For example, three windings can be employed spaced at 60°, or four windings spaced at 45°, and so on. In each case, the processing procedure can be adapted to accommodate the actual number of sensor windings.

In the above embodiment, the excitation signal was applied to the excitation winding in bursts, and signals were detected and processed from the sensor windings between the bursts. As mentioned above, this minimises errors in the position measurement caused by direct breakthrough between the excitation winding and the sensor windings. However, this is not essential since the signals induced in the sensor winding by the resonator are 90° out of phase with the direct coupled components. Therefore, they should be separated from each other by the mixers which should only demodulate the resonator signals.

In the above embodiment, the signal induced in each of the sensor windings was processed by a separate processing channel. As those skilled in the art will appreciate, the signals from the two sensor windings may be processed by a common processing channel in a time division multiplexed manner.

In yet further embodiments, the roles of the excitation winding and the sensor windings can effectively be reversed. In particular, the excitation signal may be applied to the two sensor windings, i.e. they serve as excitation windings, and the single uniformly wound solenoid may be used to sense the electromagnetic fields emitted by the resonant circuit, i.e. it acts as a sensor winding. In this arrangement, a burst of excitation signal may be initially delivered to one of the sensor windings, and then in a time-division multiplexed fashion a second burst is applied to the other sensor winding at a separate time. The single uniformly wound solenoid acting as a sensor winding will therefore receive two signals in a corresponding time multiplexed fashion. The processing unit would be correspondingly adapted to process these signals and derive the required position.

In the above embodiment at least two phase quadrature windings are required to derive an unambiguous determination of the position of the movable element within the period of the sensor windings. In other embodiments, a single periodically varying winding of the form of either of the above described phase quadrature windings can be employed, and the unambiguous position is instead derived from the use of two separate resonant circuits in a single movable element, the two separate resonant circuits being separated in the axial direction of the cylinder by a distance (preferably equal to a quarter of the period of the sinusoidal response characteristic of the single winding). In such an embodiment, the processing circuitry needs to be able to distinguish between the signals from the respective two resonant circuits. One possibility is for the two resonant circuits to be driven at different respective resonant frequencies and for the processing circuitry to be adapted accordingly to divide the overall signal induced in the winding into the two separate resonant frequencies and to then compare the two signals in an analogous manner to the procedure described for the main embodiment above.

In the above embodiment there is more than one period of the sinusoidal response characteristic of the sensor windings, hence in order to determine absolute position, additional circuiting was required to determine absolute position. In the above embodiment this was achieved by counting the number of periods that passed from a known position. In other embodiments this can be achieved in other ways. For example, a "coarse" pair of phase quadrature windings can be provided along the length of the cylinder in addition to the "fine" set of windings already described above. The coarse set of windings will have its loops further apart than the fine set of windings, and thus have a larger period, and may provide just a single period for example. The signals from the coarse pair of phase quadrature windings can then be processed by the processing circuitry to identify the fine period within which the resonant circuit is positioned. Alternatively, a plurality of separate conductor loops can be wound around the circumference of the cylinder at different heights, in order to accommodate physical arrangements where the float cannot be repositioned at will to regain zero position or for calibration purposes due, for example, to the continual presence of liquid in a reservoir. In applications where no absolute position is required to be known then such additional circuitry can be omitted. Also, in other embodiments, there may be only one period of the sinusoidal response characteristic, in which case no additional circuitry is required.

In the above embodiment the coupling element in the float comprised a resonant circuit made up of an inductor (the coil) and a capacitor. In other embodiments other resonant elements can be employed, for example a magnetostrictive resonator. Alternatively, a non-resonant element can be employed, comprising for example a short circuit coil, a magnetically soft material such as spin melt ribbon or a piece of ferrite. As those skilled in the art will appreciate, where a non-resonant element is used in the float, a continuous (as opposed to pulse-echo) excitation mode of operation must be used. A further alternative is to use a piece of metal. In this case, the processing electronics would be arranged to detect the signals induced in the sensor windings by eddy currents generated in the metal by the excitation magnetic field. The way such a system would operate is described in EP0182085, the contents of which are incorporated herein by reference.

A further alternative is to employ a harmonic generator, made of a magnetic material such as an amorphous metal alloy, instead of a resonant circuit. In this case, the excitation signal can consist of a pseudo-square wave having a fundamental frequency but with missing harmonics. The harmonic generator can be arranged to generate the missing harmonics when it transmits its electromagnetic field, and the processing circuitry can be arranged to extract some or all of this missing frequency part of the signal from the total signal received by the phase quadrature windings, hence determining the relevant part of the signal to be used for position determining purposes. Alternatively, harmonics with a d.c. offset can be generated.

Generally, the use of a harmonic generator allows the induced voltages in the phase quadrature windings to be detected and processed during continued excitation of the excitation winding. In the case of the use of magnetically soft materials, and harmonic generators, such techniques are independent of the orientation of the movable element, and hence floats incorporating these methods can be allowed to rotate in any plane. This advantageously allows float shapes such as spheres to be used, which allows for flexibility of designs which can make good use of the advantage that the geometries employed in the various embodiments render the signals induced in the phase quadrature windings substantially or fully insensitive to the position of the movable element in the lateral direction, i.e. in the radial direction of the cylinder. In the case of the resonant circuit approach however, tilt about the vertical plane will tend to produce inaccuracies in the determination of the position. Consequently, depending on the likelihood of such tilt occurring in any particular application, the diameter of the float can be made appropriately close to the diameter of the cylinder bore, so restricting the possibility of any such vertical tilt.

In further alternative embodiments, the capacitor that forms part of the resonant circuit in the float may be replaced with an AC power source. The AC power source can conveniently comprise a battery arranged to power an AC generating circuit. When the float is of this form, then the powered coil is able to generate its own magnetic fields, and hence the separate solenoid winding used in the above embodiment as the excitation winding can be omitted.

In another embodiment, the float may comprise a coil inductively coupled to the phase quadrature windings, with the ends of the coil being connected to the processing circuitry such that upon energisation of the phase quadrature winding, a signal is induced in the coil of the float which varies with relative position between the float and the quadrature windings. However, such an embodiment is not preferred since it requires leads to be attached to the moving float.

In the above embodiment the float comprising the resonant circuit was positioned inside the excitation and sensor windings. In other embodiments the float (or other coupling element) can be formed as a toroid or similar element and positioned around the outside of the phase quadrature windings. In this case, the diameter of the toroid needs to be sufficiently small so that the return flux of the electromagnetic field from the excitation windings includes elements that lie outside the extent of the toroid, as otherwise there would be zero net field coupled into the toroid. Preferably, in such an embodiment, the sensor windings would be wound around the outside of the excitation winding so that they are the closest to the windings of the resonator.

In the above embodiment the position encoder was employed to measure the level of a liquid in a reservoir of an automatic drinks machine. In other embodiments the encoder is adapted to measure the levels of liquids in other environments. In particular, where liquids are to be held or dispensed from sufficiently narrow or cylindrical type containers, then the excitation winding and the sensor windings can be arranged on the outside of the actual cylindrical (or similar shaped container). One typical example of this is a pipette dispensing arrangement. Another similar situation is with the level of liquid in a syringe. Generally speaking the present invention is suitable for a wide range of fluid dispensing applications, including pharmaceutical dispensing arrangements, fuel delivery arrangements and drink dispensing. In other embodiments the linear position encoder can be arranged to monitor the level of powders or other inhomogeneous media as well as that of liquids. In other embodiments, by measuring the level of a liquid, effectively another parameter is sensed, for example in transducers such as liquid thermometers or liquid barometers etc. Furthermore, although in the above embodiments the linear position encoder has been used to measure the level of a liquid, by employing a float, the arrangement of windings and resonant circuit can be used to measure other linear positions, by fixing of the resonant circuit or the winding arrangements to any movable element which is compatible with the cylindrical or similar geometries described above.

In the above embodiment the cylinder structure was based on an inner layer made of polycarbonate, the phase quadrature windings were made from electrically conducting wire wound around the polycarbonate layer, an insulation layer was provided over the windings in the form of an adhesive insulating tape, the excitation winding was formed by winding an electrically conducting wire around the insulating layer, and finally a further insulation layer formed from adhesive tape was wrapped around that winding and also served to make the overall cylinder watertight. In other embodiments, the entire coil arrangement can be embedded in a single cylinder moulding. In this case the windings can be preformed, from either electrically conducting wire or individually insulated electrically conducting wire, and then added as inserts when forming the cylinder in an insert-moulding process. In other embodiments the excitation winding and/or the sensor windings are formed by printing conducting ink onto adhesive or other tape. They can then be attached to an inner wall of a cylinder, and thereafter the excitation winding can be formed by wrapping a wire around the outside of the printed tape or by using a further layer of printed tape. The form of the sensor coils is such that they can both be printed onto a single tape and wrapped around the cylinder. This approach lends itself to very low cost manufacturing methods.

In the above embodiment the sensor windings are positioned inside the excitation winding. In other embodiments the excitation winding can instead be positioned inside the sensor windings.

What is claimed is:

1. A position detector including:
    first and second members which are relatively movable along a measuring path, the first member carrying a transmitter which is electromagnetically coupled to a receiver carried by the other member, which transmitter and receiver are arranged so that in response to the transmission of a signal by said transmitter, there is induced in said receiver an output signal which varies with the relative position of the first and second members along said measuring path;
    wherein at least one of the transmitter and receiver comprises a conductive winding having a plurality of loop portions each arranged in a respective plane intersected substantially orthogonally by the measuring path and which are arranged to form at least three sets of loops which are substantially evenly spaced along said measuring path, said loops being connected in series and being arranged so that electromotive forces induced in loops of the same set by a common alternating magnetic field add together and so that electromotive forces induced in adjacent sets of loops by a common alternating magnetic field oppose each other, whereby said output signal varies cyclically with the relative position of said first and second members.

2. A position detector according to claim 1, wherein said conductive winding is arranged so that said cyclic variation of said output signal has a period corresponding to twice the distance between adjacent sets of loops.

3. A position detector according to claim 1 or 2, wherein each of said loop portions has substantially the same diameter which corresponds to the spacing between adjacent sets of loops.

4. A position detector according to claim 1 or 2, wherein said at least one of the transmitter and receiver comprises two or more of said conductive windings, wherein in response to the transmission of a signal by said transmitter, there is induced in said receiver two or more output signals each associated with a respective one of said conductive windings and wherein the sets of loops of the respective conductive windings are interleaved between each other so that the cyclic variation of the output signals are out of phase with each other.

5. A position detector according to claim 4, wherein said at least one of the transmitter and receiver comprises two of said conductive windings and wherein the spacing between the sets of loops of the respective conductive windings is such that the cyclic variation of the respective output signals are in phase quadrature.

6. A position detector according to claim 4, wherein said conductive windings are arranged so that the cyclic variation of the associated output signals have substantially the same period.

7. A position detector according to claim 4, wherein said conductive windings are arranged so that the cyclic variation of the associated output signals have different periods.

8. A position detector according to claim 1 or 2, wherein the loop portions of said conductive winding all enclose a substantially equal area.

9. A position detector according to claim 1 or 2, wherein different ones of said loop portions of said conductive winding enclose different areas.

10. A position detector according to claim 1 or 2, wherein said loop portions are substantially circular.

11. A position detector according to claim 1 or 2, wherein each set of loops comprises one or more loops.

12. A position detector according to claim 1 or 2, wherein each set of loops comprises the same number of loop portions.

13. A position detector according to claim 1 or 2, wherein different sets of loops comprise different numbers of loop portions.

14. A position detector according to claim 1 or 2, wherein the conductive winding is formed by a conductor wrapped around a support.

15. A position detector according to claim 14, wherein said conductor is an insulated wire.

16. A position detector according to claim 1 or 2, wherein the conductive winding is formed as a printable conductor printed on a substrate which is wrapped around a support.

17. A position detector according to claim 1 or 2, wherein said sets of loops of the conductive winding are arranged so that the output signal varies substantially sinusoidally with the relative position of said first and second members.

18. A position detector according to claim 1 or 2, further comprising at least one separate conductive winding having at least one loop for use in resolving cyclic ambiguity caused by said cyclic variation of said output signal, to provide absolute position sensing.

19. A position detector according to claim 1 or 2, wherein said conductive winding is encapsulated in a moulding forming a cylinder.

20. A position detector according to claim 1 or 2, wherein the transmitter comprises an electromagnetic device and wherein the receiver comprises the conductive winding.

21. A position detector according to claim 20, wherein said electromagnetic device is passive and wherein the member carrying the receiver also carries means for supplying energy to said transmitter.

22. A position detector according to claim 21, wherein said energy supplying means comprises a conductor winding having a plurality of turns of conductor wound in a solenoid along said measuring path.

23. A position detector according to claim 1 or 2, wherein said transmitter comprises the conductive winding.

24. A position detector according to claim 23, further comprising an electromagnetic device which is electromagnetically coupled to both said transmitter and said receiver and is arranged so that it is energisable by said transmitter and, upon energisation, is operable to generate said output signal in said receiver.

25. A position detector according to claim 24, wherein said receiver comprises a conductive winding having a plurality of turns of conductor wound in a solenoid along said measuring path.

26. A position detector according to claim 25, wherein said solenoid winding is arranged to have a substantially constant coupling with said electromagnetic device.

27. A position detector according to claim 22, wherein said solenoid winding is arranged to generate a substantially uniform magnetic field along said measuring path in response to a driving signal being applied thereto.

28. A position detector according to claim 22, wherein said solenoid winding is of substantially circular cross-section.

29. A position detector according to claim 22, wherein said solenoid winding is wound on the inside of the conductive winding.

30. A position detector according to claim 22, wherein said solenoid winding is wound around the outside of the conductive winding.

31. A position detector according to claim 21, wherein said electromagnetic device comprises a ferrite element or a magnetically permeable element.

32. A position detector according to claim 20, wherein the electromagnetic device comprises a resonator.

33. A position detector according to claim 32, wherein said resonator comprises a resonant circuit.

34. A position detector according to claim 33, wherein said resonant circuit comprises an inductor coil whose axis is parallel to said measuring path, and a capacitor.

35. A position detector according to claim 32, wherein said electromagnetic device comprises two of said resonators in a single movable element, the two resonators being separated along the measurement path.

36. A position detector according to claim 32, wherein said resonator comprises a magnetostrictive element.

37. A position detector according to claim 20, wherein said electromagnetic device comprises a harmonic generator.

38. A position detector according to claim 20, wherein said electromagnetic device comprises an inductor coil whose axis lies parallel to the measuring path.

39. A position detector according to claim 20, wherein said transmitter is arranged to move along said measuring path through the inside of said loop portions.

40. A position detector according to claim 20, wherein said transmitter is arranged to move along said measuring path around the outside of said loop portions.

41. A position detector according to claim 20, wherein said transmitter is mounted on a float and wherein the conductive winding is fixed and said float is operable to move relative to the conductive winding with the surface level of a fluid.

42. A position detector according to claim 41, wherein the conductive winding is mounted around a cylinder with a bore which extends along said measuring path and wherein said float is constrained to move along said measuring path within said bore.

43. A position detector according to claim 41, wherein said float a spherical.

44. A position detector according to claim 1 or 2, further comprising processing means for processing the output signal to provide an indication therefrom of said relative position of said first and second members.

45. A position detector according to claim 44, wherein said at least one of the transmitter and receiver comprises two or more of said conductive windings, wherein in response to the transmission of a signal by said transmitter, there is induced in said receiver two or more output signals each associated with a respective one of said conductive windings, wherein the sets of loops of the respective conductive windings are interleaved between each other so that the cyclic variation of the output signals are out of phase with each other and wherein said processing means is operable to process said two or more output signals using a ratiometric function.

46. A position detector according to claim 45, wherein said processing means is operable to process said signals using an arc-tangent function.

47. A position detector according to claim 44, wherein said transmitter is operable to transmit said signal during a first time interval and wherein said processing means is operable to process the output signal during a second time interval subsequent to said first time interval.

48. A position detector according to claim 44, wherein said processing means comprises means for mixing the output signal with a phase matched version of the signal transmitted by said transmitter.

49. A position detector according to claim 44, wherein said processing means comprises means for counting cycles of said cyclic variation from a reference position to provide an absolute indication of the relative position of said first and second members.

50. A method of detecting the position between first and second members which are relatively movable along a measuring path, the method comprising the steps of:
  providing a transmitter on the first member which is electromagnetically coupled to a receiver carried by the second member, the transmitter and receiver being arranged so that in response to the transmission of a signal by said transmitter, there is induced in said receiver an output signal which varies with the relative position of the first and second members along said measuring path;
  wherein at least one of the transmitter and receiver comprises a conductive winding having a plurality of loop portions each arranged in a respective plane intersected substantially orthogonally by the measuring path and which are arranged to form at least three sets of loops which are substantially evenly spaced along said measuring path, said loops being connected in series and being arranged so that electromotive forces induced in loops of the same set by a common alternating magnetic field add together and so that electromotive forces induced in adjacent sets of loops by a common alternating magnetic field oppose each other, whereby said output signal varies cyclically with the relative position of said first and second members;

causing said transmitter to transmit a signal;

receiving a signal using said receiver which varies with the relative position of said first and second members; and processing said received signal to determine the relative position of said first and second members.

* * * * *

UNITED STATES PATENT AND TRADEMARK OFFICE
CERTIFICATE OF CORRECTION

PATENT NO.     : 6,561,022 B1                                    Page 1 of 1
DATED          : May 27, 2003
INVENTOR(S)    : Richard Alan Doyle et al.

It is certified that error appears in the above-identified patent and that said Letters Patent is hereby corrected as shown below:

<u>Column 14,</u>
Line 18, "float a spherical." should read -- float is spherical. --.

Signed and Sealed this

Twenty-second Day of July, 2003

JAMES E. ROGAN
*Director of the United States Patent and Trademark Office*